United States Patent [19]

Evans

[11] Patent Number: 5,143,199
[45] Date of Patent: Sep. 1, 1992

[54] HYDROSTATIC COOKER INFEED

[75] Inventor: Donald E. Evans, Hilliard, Ohio

[73] Assignee: Don Evans and Associates, Inc., Hilliard, Ohio

[21] Appl. No.: 726,635

[22] Filed: Jul. 2, 1991

Related U.S. Application Data

[63] Continuation of Ser. No. 415,084, Sep. 29, 1989, abandoned.

[51] Int. Cl.⁵ .................................................. B65G 47/30
[52] U.S. Cl. ............................... 198/418.1; 198/418.6; 198/433; 198/484.1; 198/463.4; 198/817
[58] Field of Search ............... 198/817, 418.6, 418.1, 198/433, 720, 463.4, 484.1, 803.13

[56] References Cited

U.S. PATENT DOCUMENTS

| | | | |
|---|---|---|---|
| 1,301,428 | 4/1919 | Gitterman | 99/361 X |
| 1,302,171 | 4/1919 | Johnson | 99/360 X |
| 2,313,706 | 3/1943 | Willoughby | 198/418.6 |
| 2,353,805 | 7/1944 | Baker | 99/360 X |
| 2,748,550 | 6/1956 | Soldner | 198/418 X |
| 2,759,594 | 8/1956 | Kleboe et al. | 198/814 |
| 2,771,645 | 11/1956 | Martin | 422/304 |
| 2,814,980 | 12/1957 | Reed | 99/362 |
| 2,835,003 | 5/1958 | Abrams | 422/304 |
| 3,072,239 | 1/1963 | Jones et al. | 198/484.1 X |
| 3,124,231 | 3/1964 | Ott, Jr. | 198/604 |
| 3,286,619 | 11/1966 | Lee | 99/362 |
| 3,403,772 | 10/1968 | Vadas | 198/419.2 |
| 3,434,585 | 3/1969 | Lee | 198/484.1 X |
| 3,545,985 | 12/1970 | Mencacci et al. | 99/362 X |
| 3,547,248 | 12/1970 | Mencacci | 198/484.1 X |
| 3,568,816 | 3/1971 | Smith et al. | 198/484.1 |
| 3,575,275 | 4/1971 | Reimers et al. | 198/484.1 X |
| 3,598,222 | 8/1971 | Mencacci | 198/484.1 X |
| 3,970,188 | 7/1976 | Smorenburg | 99/360 X |
| 4,078,361 | 3/1978 | Hartness et al. | 198/418.6 X |
| 4,155,441 | 5/1979 | Albrecht et al. | 198/431 X |
| 4,352,423 | 10/1982 | Santen | 99/362 X |
| 4,415,539 | 11/1983 | Pohorski | 422/304 |
| 4,457,419 | 7/1984 | Ogami et al. | 198/345 |
| 4,803,055 | 2/1989 | Neda | 422/297 |
| 4,823,940 | 4/1989 | Cretser | 198/817 |

*Primary Examiner*—D. Glenn Dayoan
*Attorney, Agent, or Firm*—Litman, McMahon & Brown

[57] ABSTRACT

A hydrostatic cooker infeed apparatus includes a double cable conveyor transporting horizontally oriented containers to a single cable, stick assembly conveyor. A braking mechanism in conjunction with a counting mechanism limits the number of containers entering an assembly pocket of the stick assembly conveyor. An assembed stick of containers is simultaneously ejected from the assembly pocket by linkage which is synchronously coordinated with an underlying flight conveyor, which transports the stick to a continuous hydrostatic cooker chain for batch loading thereon.

9 Claims, 4 Drawing Sheets

Fig.1.

HYDROSTATIC COOKER INFEED

This application is a continuation of Ser. No. 415,084 filed Sep. 29, 1989, and now abandoned.

FIELD OF THE INVENTION

The present application relates to a hydrostatic cooker infeed apparatus and process for batch loading filled containers of canned goods into hydrostatic cookers such that full utilization of each flight of the conveyor chain transporting the containers through the cooker can be obtained efficiently without damaging containers during a loading process.

BACKGROUND OF THE INVENTION

Many types of foods are packaged in discrete packages or cans and then cooked in long trays that are slowly conveyed through a heated chamber. Multiple packages are placed in each tray.

The capacity of hydrostatic cookers to process foods is generally limited by the ability to quickly and reliably load filled containers onto cooking trays on an endless flight conveyor chain which routes the containers containing the food through the cooker. Problems associated with loading and container damage are magnified when the containers must be arranged and loaded at high processing rates.

In the loading of canned foods by conventional apparatus, containers are placed along a common horizontally aligned axis end-to-end, and form a grouping for each tray, commonly referred to as a "stick". Each stick is positioned on a respective tray or flight of the endless chain which transports the containers through the various processing stages of the cooker. Typically the stick of containers is of the order of seven feet in length. The number of containers in each stick is determined by the axial length of each of the containers in the stick. The diameter range of the containers in the sticks is determined by the particular design of the ribs in the links of the cooker chain and the curvatures of the sprockets and the profiles of the chain as it is routed through the cooker.

To obtain maximum operational capacity from the hydrostatic cooker, the entire stick of containers must be assembled and loaded onto a tray or flight of the endless chain of the cooker during a time interval which is somewhat less than the amount of time required for the endless chain to travel a distance equal to the spacing between adjacent flights of the endless chain. If unsuccessful in assembling an entire stick of containers during the allowable time, the particular flight corresponding thereto will either travel empty through the cooker or will travel with less than a full stick of containers, which reduces the handling capacity of the cooker as to that particular flight. Attempts at speeding up the process of assembling a full stick in the relatively short time available have typically resulted in inefficiencies in the form of damaged, broken or jammed containers.

Therefore, a decided need exists for an improved apparatus and procedure for quickly and efficiently assembling sticks of containers in a time frame whereby full utilization of each flight of an endless chain coursing through a hydrostatic cooker can be realized, while maintaining the forward speed of the drive chain at an optimum rate to properly cook the food at a desired temperature while in the cooker.

SUMMARY OF THE INVENTION

An improved hydrostatic cooker infeed apparatus is provided to feed cans or the like containing various food products onto trays mounted on a continuous conveyor passing in a serpentine manner through the cooker. The apparatus includes a mechanism for automatically counting and assembling a horizontally-oriented elongate stick of filled, closed containers of food. In assembling the stick of containers, the filled, closed containers are transported to an infeed transport conveyor system and positioned in one or more parallel lanes thereon such that the axis of each container is generally horizontally aligned and coaxial with other containers in a respective lane.

Each lane of the infeed transport conveyor system includes an initial double cable conveyor which transports the horizontally-oriented, filled containers longitudinally to a single cable transfer conveyor which is positioned substantially inline with the double cable transport conveyor. Vertically aligned plate, rod or angle guides, which are positioned slightly above and along each side of each lane over the transport and transfer cable conveyors and which have a spacing therebetween which is slightly greater than the largest diameter of the containers being transported therethrough, maintain the positioning of the containers above the cables of the transport and transfer conveyors while being transported thereby.

The cable of the infeed transfer conveyor is operated at a faster linear velocity than that of the cables of the infeed transport conveyor. As a result of the variance between the cable velocities of the two co-linear conveyors, adjacent food containers transferred from the transport conveyor to the transfer conveyor are separated by a gap therebetween such that the containers can be automatically counted by counting devices that sense the gaps between the containers.

When a sufficient number of containers has been transported into an assembly zone or pocket of the infeed transfer conveyor such that an entire stick of containers has been assembled therein, the counting mechanism signals a pneumatic control lift associated with the infeed transport conveyor system.

Upon receiving the signal from the counting mechanism, a horizontal bar or brake, which is positioned immediately below the spacing between the cables of the infeed transport conveyor system, is activated such that subsequent oncoming containers are lifted up and off the cables of the transport conveyor system whereby additional oncoming containers are prevented from entering into the now filled pocket while the assembled stick of containers continues to reside therein. In the embodiment utilizing the brake, whether the brake is activated or not and whether the stick is fully assembled or not, the transport and transfer cable conveyors continue to run continuously to perform their designated functions during the present or subsequent stick assembly cycles.

In close proximity to and positioned immediately below the infeed transfer conveyor system is a loading flight conveyor wherein the flights, with a plurality of evenly spaced voids therebetween defined by the flight bars or spacers, of the upper run of the loading conveyor travel in a direction away from the hydrostatic cooker and in a direction transverse to that of the cables of the infeed transfer conveyor system. The dimensions of the voids of the flights of the loading conveyor are slightly greater than the diameter of the largest containers for which the apparatus in accordance with the present invention will be utilized.

As each void associated with a particular pair of adjacent flights of the loading conveyor is appropriately positioned beneath an assembled stick of containers contained in a pocket of the infeed transfer conveyor system, a transfer linkage mechanism is, automatically or manually, pneumatically activated which kicks or sweeps the entire stick of containers sidewardly and downwardly into the empty flight void of the loading conveyor situated immediately therebelow. The continuously moving loading conveyor then transports the stick of containers along the top run thereof whereupon the containers are supported in sliding relationship by a shelf or alternatively by a bottom wall connecting adjacent flights. The containers then pass over and around an end sprocket of the loading conveyor wherein the containers are confined within the flight void by a duct or sleeve along which the containers slide. The sleeve is also spaced along the bottom or return run of the loading conveyor to a lip on the sleeve which directs and causes the entire stick to be synchronously, simultaneously and gravitationally deposited in an open void or pocket of the endless cooker flight conveyor chain which, in turn, routes the stick of containers through the cooker.

The pocket of the cooker chain is formed by two opposed flight walls that are angled to converge at the distal ends thereof when the cooker chain is planar, but diverge from one another when the chain goes around a curve. In particular, each cooker chain pocket is opened to receive a respective container stick from the loading flight conveyor by virtue of curvature associated with the cooker chain at the location where the stick is loaded thereon such that the ribs or keepers formed by the walls of the flights, which normally close over the containers retaining them within a pocket of the cooker chain, are sufficiently spread apart to permit containers having diameters within an allowable range to pass therebetween and thus be deposited in the cooker chain pocket.

The infeed transport conveyor system and the transfer conveyor associated inline therewith are designed such that a plurality of sets of such inline transport and transfer conveyors with associated lanes can be positioned in side-by-side relationship such that a multiplicity of container sticks can be simultaneously assembled and swept onto side-by-side flight voids of the underlying loading conveyor. The continuously moving loading conveyor then transports the sticks of containers to a loading station of the hydrostatic cooker chain for sequential loading thereon, thereby greatly increasing the ability to load filled, closed containers onto the endless flight chain of the hydrostatic cooker. The actual number of lanes for any particular application is determined by the time required to assemble a stick of containers relative to the linear velocity of the cooker chain: the greater the linear velocity of the cooker chain, the greater the number of lanes needed to keep pace therewith.

Another embodiment of the present invention provides a cam-operated stick transfer mechanism wherein the assembled container sticks in pockets of the infeed transfer conveyor system are automatically mechanically transferred to an underlying loading conveyor by synchronizing the triggering mechanism of the cam with the voids between the bars of the loading flight conveyor.

OBJECTS OF THE INVENTION

Therefore, the objects of the present invention are: to provide an apparatus and a process to quickly and reliably assemble containers into a stick formation; to provide an apparatus and a process wherein the containers are transported to an infeed transfer conveyor system by a transport cable conveyor; to provide an apparatus and a process wherein a cable conveyor draws the individual containers into a pocket of the infeed transfer conveyor such that the individual containers can be counted; to provide a control and braking mechanism and a process wherein the oncoming containers are restrained from entering onto the infeed transfer conveyor system after a sufficient number of containers is contained in a pocket to form a complete stick of containers; to provide an apparatus and a process wherein the ejection of assembled sticks from the infeed transfer conveyor is controlled by linkage which is coordinated and synchronized with the movement of the voids between the flight bars of an underlying loading conveyor; to provide an apparatus and a process which efficiently assembles stick containers in such a manner to obtain maximization of loading of the flights of an endless chain of a hydrostatic cooker regardless of the linear velocity thereof; to provide an apparatus and a process such that the excessive time constraints normally imposed upon loading procedures of the flights of an endless chain of a hydrostatic cooker are reduced or eliminated; to provide an infeed apparatus to a hydrostatic cooker and a process which reduces or eliminates the constraints which normally lead to damaging, jamming or breaking of food containers; and to generally provide an apparatus which is relatively easy to use, simple to maintain, easy to operate efficiently and reliably, and which generally performs the requirements of its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words (and derivatives thereof) "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. "Upstream" and "downstream" relate to the product flow path.

The reference numeral 1 generally refers to an infeed apparatus in accordance with the present invention. The infeed apparatus is shown mounted on a hydrostatic cooker 2 in FIG. 1. Cookers, such as the illustrated cooker 2, are known in the industry and have been previously described in U.S. Pat. No. 3,286,619 issued to Harold B. Lee, which is incorporated herein by reference. Of particular interest herein are the parts of the hydrostatic cooker 2 as such parts relate to and interface with the infeed apparatus 1 of the present invention. In an associated canning process (not shown) containers 3 are filled with food and closed. The containers 3 are transported through the infeed apparatus 1.

Figure 2:
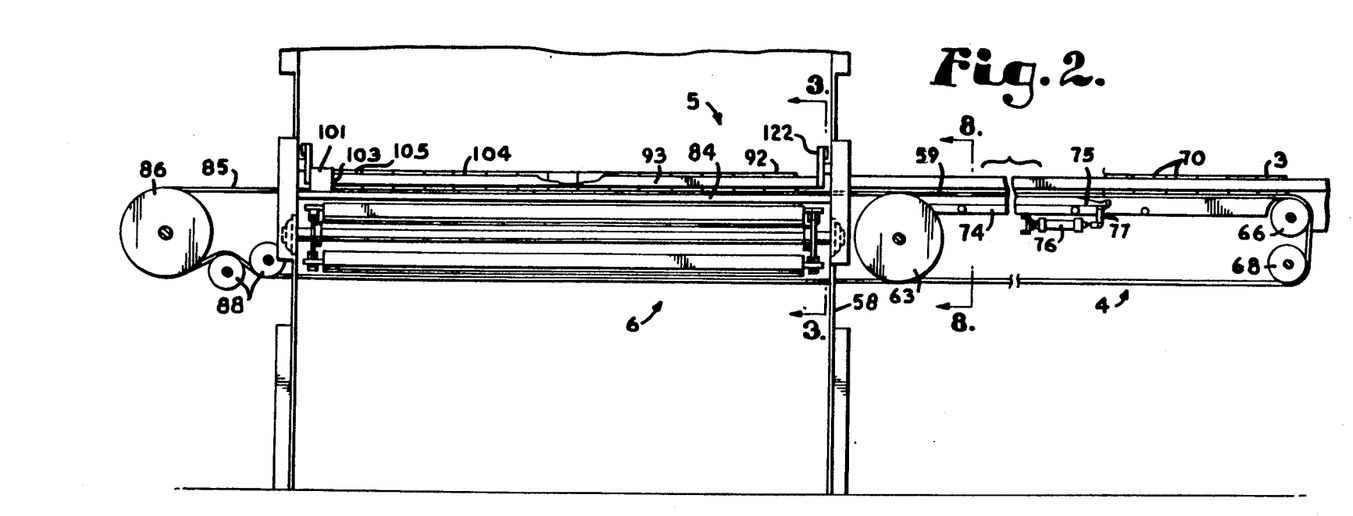
FIG. 2 is an enlarged and fragmentary side elevational view showing a transport conveyor system and a transfer cable conveyor system with portions broken away to show detail thereof, and an end elevational view of a loading flight conveyor system.

The infeed apparatus 1 include a transport cable conveyor portion 4, a transfer cable conveyor portion 5, and a loading flight conveyor portion 6, as shown in FIG. 2.

Figures 3, 6:
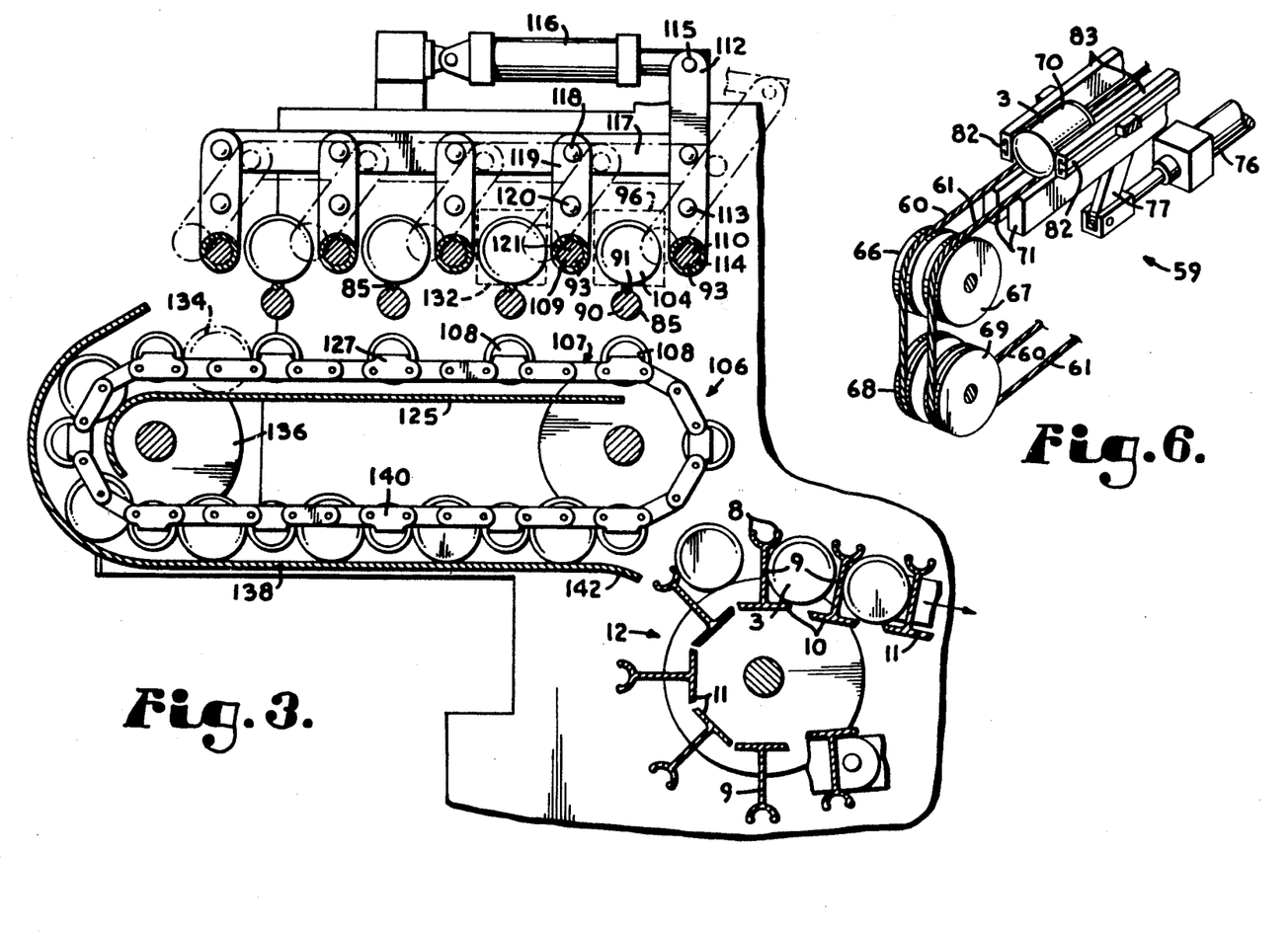
FIG. 3 is an enlarged and fragmentary schematic cross-sectional view of the infeed apparatus taken along line 3—3 of FIG. 2, showing the transfer conveyor system with an associated linkage in a loading configuration and (in phantom) in a transfer configuration, the loading conveyor, and a flight chain of the cooker.
FIG. 6 is an enlarged and fragmentary schematic perspective view of the infeed apparatus similar to that of FIG. 5 showing the guide rails along each side thereof.

After being transported through the infeed apparatus 1 of the present invention, the containers 3 are delivered to a loading station 7 of the hydrostatic cooker 2. At the cooker loading station 7, means such as structural curvature are provided to allow substantial displacement between the outer extremities 8 of ribs or keepers 9 of adjacent links 10 of an endless flight conveyor drive chain 11 so as to open pockets 12 formed between adjacent keepers 9, such that the containers 3 may be received therein. As the links 10 progress past the loading station 7, the curvature of the drive chain 11 is decreased, such that the extremities of the ribs 9 approach each other, such as is shown in FIG. 3, so that the pockets 12 close around and effectively retain the containers 3 therein for routing through the cooker 2.

Figure 1:
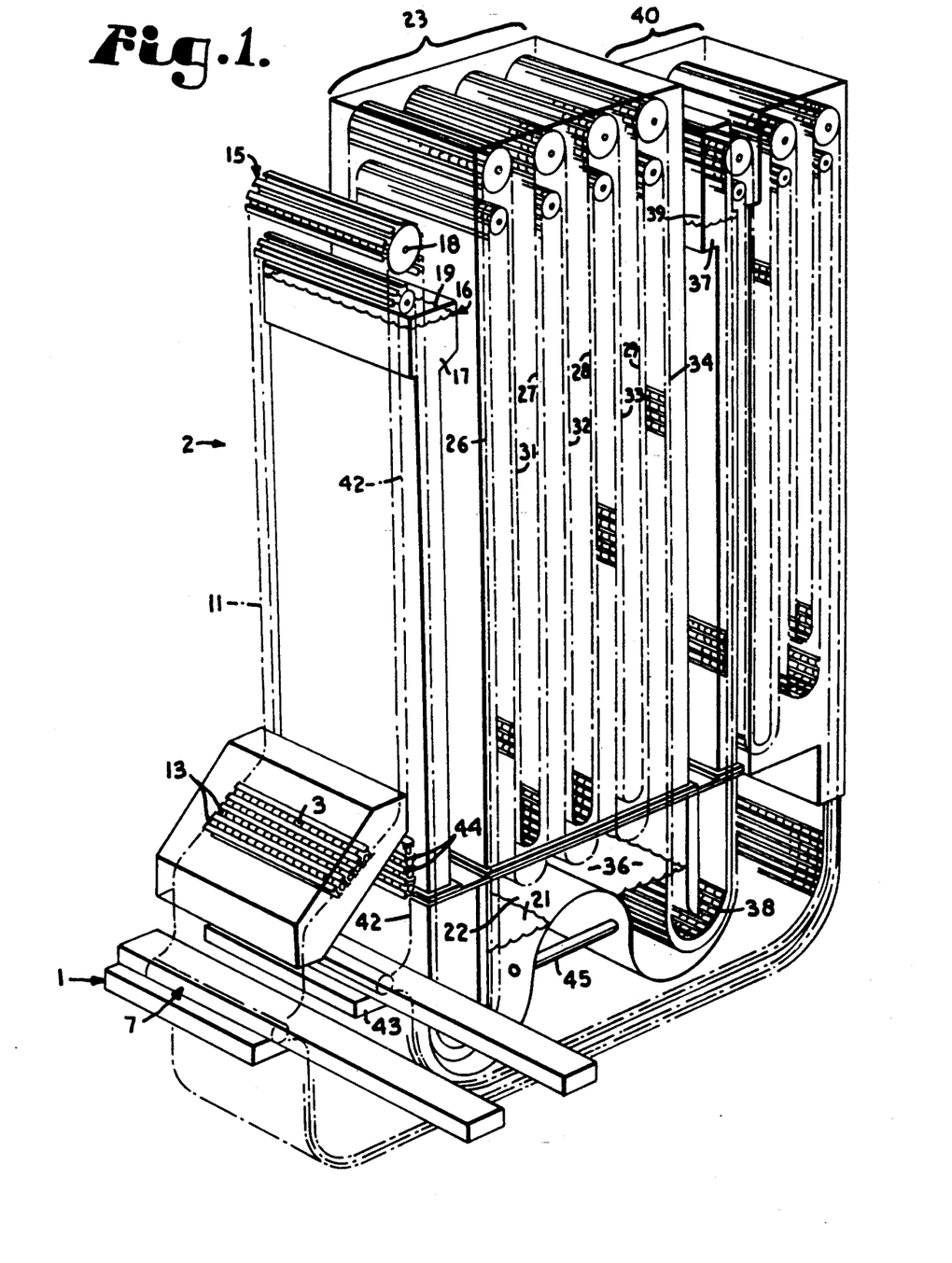
FIG. 1 is a schematic diagram of a perspective view of a hydrostatic cooker including an infeed apparatus in accordance with the present invention.

Preferably, a plurality of the filled, closed containers are positioned horizontally end-to-end in each pocket 12 of the endless flight conveyor chain 11 to form a "stick" 13 of containers 3 therein as shown in FIG. 1. The loading station 7 of the cooker 2 is generally open to the ambient atmosphere.

The first phase of the routing of the container sticks 13 through the cooker 2 involves transporting the container sticks 13 to a location indicated by the reference arrow 15 where the elevation of the sticks 13 is greater than the level of an upper surface 16 of a water column 17, which typically has a height on the order of approximately 40 feet. After reaching the location indicated by the arrow 15, the cooker flight conveyor chain 11 then cascades over a sprocket 18 such that the food container sticks 13 are transported downwardly through an upper surface 19 of the water column 17, as shown in FIG. 1. The diameter of the sprocket 18, as well as the curvature of the flight chain 11 throughout its coursing through the cooker 2, is less than a certain minimum amount such that the extremities 8 of ribs 9 of adjacent links 10 of the cooker flight chain 11 will remain in sufficiently close proximity to each other such that the containers 3 cannot escape from the pocket 12 therebetween but, instead, will be retained therein.

As the container sticks 13 continue their progress downwardly through the water column 17, the container sticks 13 are subjected to an increasing head of pressure. The flight chain 11 then transports the containers 3 through a lower surface 21 of the water column 17. Routing the sticks 13 through the water column 17 serves to preheat the food containers 3 and to maintain steam in a subsequent steam chamber 22.

In particular, as the containers 3 emerge through the lower water column surface 21, they enter the steam chamber 22 containing steam under somewhat greater than atmospheric pressure in a main cooking and sterilizing portion 23 of the cooker 2. The difference in elevation between the upper water surface 19 and the lower surface 21 of the water column 17 effectively maintains the steam in the chamber 22 and is generally proportional to the temperature and pressure of the steam in the chamber 22, that is, the temperature and steam pressure to which the food container sticks 13 will be subjected during passage through the cooking and sterilization portion 23. The pressure of the steam in the chamber 22 provides the hydrostatic force which maintains the elevation differential between the surfaces 19 and 21 of the water column 17.

Cooking and sterilization is a function of time and temperature. Therefore, the residence time required at a particular temperature prescribes the required linear velocity of the flight chain 11. The drive chain 11 in the cooker portion 23 is serpentine and is reeved through four vertical upward flights 26, 27, 28, and 29, and four downward flights 31, 32, 33, and 34, as shown in FIG.

1; however, the number of flights can vary between different cookers.

After the food containers 3 have spent sufficient residence time in the cooking and sterilizing portion 23 of the cooker 2, the chain 11 conveys the container sticks 13 through a lower surface 36 of a leg of a second water column 37 to begin a cooling down procedure. (Where the containers 3 have been transported through the surface 36, the contents of now processed sticks 38 have been fully cooked.) As with the pre-heating water column 17, the difference in elevation between an exit surface 39 and the entry surface 36 of the cooling water column 37 is maintained by the steam pressure generated in the cooking and sterilizing portion 23.

As processed container sticks 38 on the chain 11 emerge through the exit surface 39 of the cooling water column 37, the sticks 38 are subjected to further temperature reduction in a cooling portion 40 of the cooker 2. After sufficient residence time in the cooling portion 40 such that the temperature of the processed container sticks 38 has been reduced to an acceptable handling level, the chain 11 routes the processed sticks 38 back to the vicinity of the loading station 7 of the cooker 2 to be discharged therefrom so that the next batch of closed, filled container sticks 13 can be cycled through the cooker 2.

As shown in FIG. 1, a second flight chain 42, with separate cooker infeed apparatus 43 and loading station 44, is configured to concurrently and independently cycle other food container sticks 45 through the cooker 2 so that greater utilization of the cooker 2 can be realized. The cooker drive chains 11 and 42, with container sticks 13 and 45 respectively therein, are reeved in close proximity to each other and generally follow the same path adjacent to one another. In addition, the second chain 42 can be operated at a linear velocity different from that of the first chain 11, thereby providing the ability to simultaneously process two different types of foods which may require substantially different residence times in the cooker 2. It is foreseen that the number of flight chains routed through the cooker 2, utilizing input apparatus according to the present invention, can even be greater than the two schematically shown in FIG. 1, the actual number being limited only by the physical design capacity of the cooker 2 and its related structure.

A feature of the cooker 2 is that incoming batches of containers 13 tend to reduce the average temperature of the pre-heating water column 17, whereas the processed batches of containers 38 tend to increase the average temperature of the cooling water column 37. To overcome these undesirable tendencies, circulating means (not shown) are provided to transfer water through conduits, such as that shown at 46 in FIG. 1, between the two water columns 17 and 37.

Figure 4:
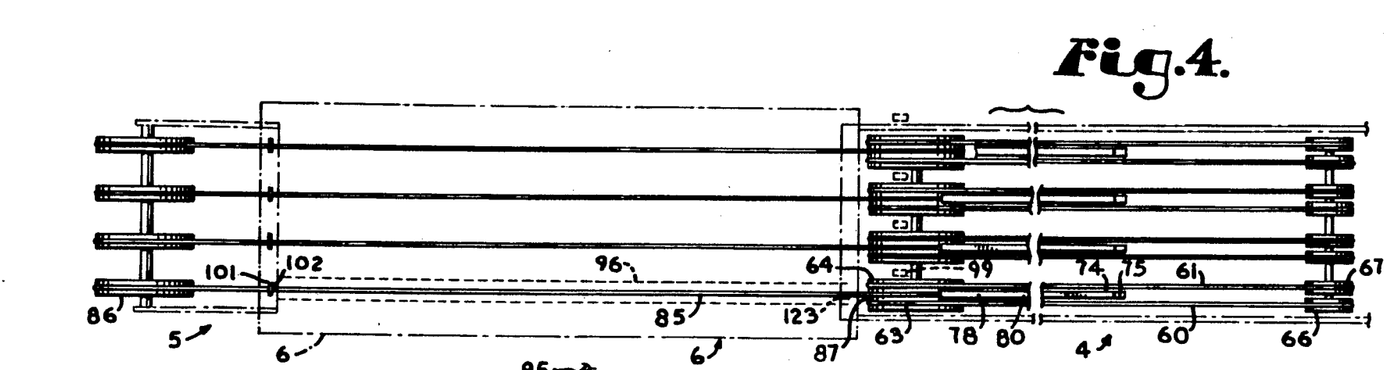
FIG. 4 is an enlarged and fragmentary top plan view of the infeed apparatus cable and pulley arrangements of the transport conveyor system and the transfer conveyor system in relationship to the loading flight conveyor.

The infeed apparatus 1 is generally shown in FIGS. 2 and 4. The infeed apparatus 1 is utilized in conjunction with the hydrostatic cooker 2 for processing the filled, closed food containers 3.

The infeed transport conveyor portion 4, the infeed transfer conveyor portion 5, and the flight loading conveyor portion 6 of the infeed apparatus 1 are mounted in rigid frame means, such as the frame 58 shown in FIG. 2, with necessary supporting, anchoring, connecting and cross stiffener members (not shown).

Figure 5:
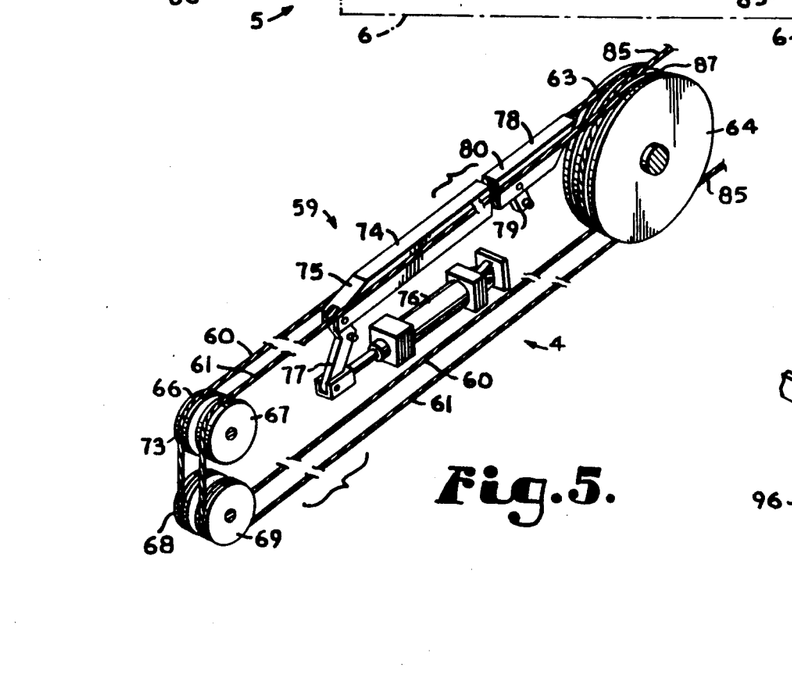
FIG. 5 is an enlarged and fragmentary perspective view of the infeed apparatus schematically showing a single lane of the transport conveyor system with a braking mechanism thereof.
Figure 7:
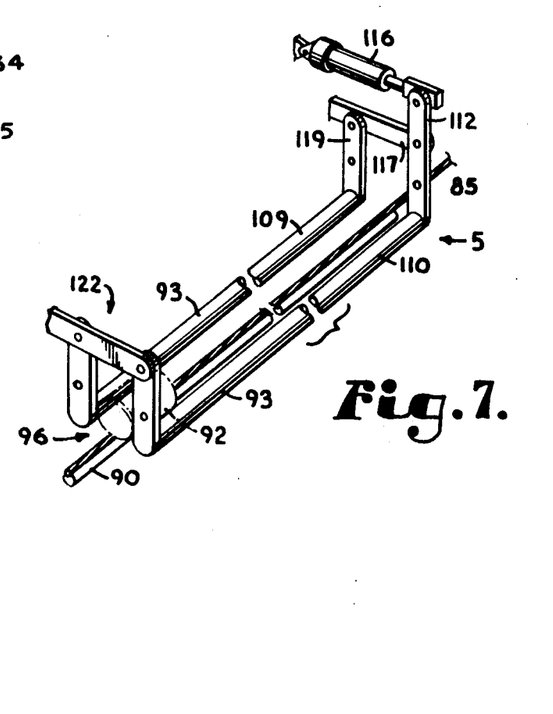
FIG. 7 is an enlarged and fragmentary perspective view of the infeed apparatus schematically showing the transfer conveyor system and assorted linkage in a loading configuration.

The infeed transport conveyor portion 4 includes transportation means comprising a cable conveyor 59, as shown schematically in perspective in FIGS. 5 and 6, having two substantially horizontally-oriented tension members, in this example taking the form of endless cables 60 and 61. (Each lane of the cable conveyor will be similarly equipped to the lane shown with such cables.) The cables 60 and 61 are preferably constructed of stranded steel or the like, however, it is to be understood that other supporting flexible configurations such as belts resistant to the needed tension may be used if desired. 15 Each of the cables 60 and 61 is reeved through a system of pulleys, as follows: a pair of head or driving pulleys 63 and 64 at the downstream end of the cables 60 and 61 provides the driving force thereto; a pair of tail or driven pulleys 66 and 67 at the upstream end of the cables 60 and 61 which maintain the cables 60 and 61 in substantially horizontal alignment relative to the head pulleys 63 and 64; and take-up pulleys or sheeves 68 and 69 which provide necessary tensioning force so that the load of filled containers 3 does not cause the cables 60 and 61 to overly sag. The take-up pulleys 68 and 69 allow each of the cables 60 and 61 to be individually tensioned, thereby providing means for accommodating cables of slightly different lengths and for further accommodating the cables as they stretch at varying rates during usage. The drive pulleys 63 and 64 are continuously driven with an uninterrupted motion by suitable motor means (not shown) such as an electric motor connected to the shaft of the pulleys 63 and 64 by a drive belt or chain.

The two side-by-side cables 60 and 61 of the cable conveyor 59 are laterally spaced such that a plurality of containers 3 that are positioned so that the axes thereof are parallel to the cables 60 and 61 and horizontal and generally identified by the reference numeral 70 can be placed thereon while maintaining intimate contact with the cables 60 and 61. Each of the cables 60 and 61 is supported by bars or standards 71, extending from the immediate proximity of the pulleys 66 and 67 to the immediate proximity of the pulleys 63 and 64, so as to support the cables 60 and 61 with the filled containers 70 thereon. Longitudinal grooves 72 in the upper surfaces of the standards 71 function as guides for tracking cables 60 and 61 therealong. Similarly, circumferential grooves 73 in the pulleys 63, 64, 66, 67, 68 and 69 operably function as guides for the respective cables 60 and 61.

Figure 8:
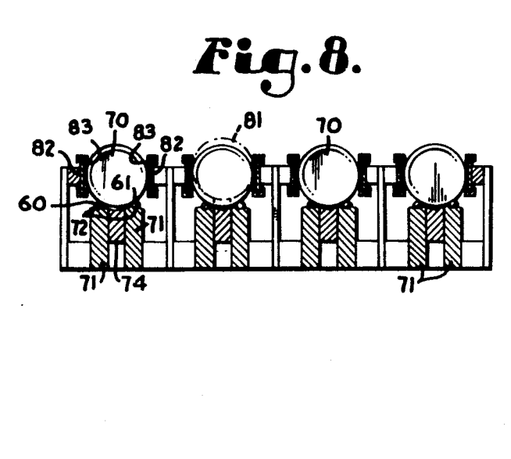
FIG. 8 is an enlarged cross-sectional view of a four-lane, double cable infeed transport conveyor system taken along line 8—8 of FIG. 2, showing in phantom one lane with the braking mechanism activated.

Positioned between the cables 60 and 61 and substantially parallel to a plane passing through the parallel cables 60 and 61 of the infeed transport conveyor 59 is an infeed braking bar 74. The width of the bar 74 in a direction perpendicular to the direction of travel of the cables 60 and 61 is less than the spacing between the cables 60 and 61 at the location of the bar 74 such that the bar 74 in an elevated position, as hereinafter described, does not interfere with the motion of the cables 60 and 61. In a lowered position thereof, the bar 74 is positioned below the cables 60 and 61 and allows free passage of the containers 70 along the cables 60 and 61. The braking bar 74 has an upstream end 75 which is connected to a pneumatic cylinder control lift 76 via a pivot arm 77. The downstream end 78 of the bar 74 is similarly attached to another pivot arm 79 such that activation of the cylinder 76 causes an upper surface 80 of the bar 74 to be uniformly elevated along its entire length, thereby remaining substantially parallel to the plane created by the cables 60 and 61, which lifts containers 70 up and clear of the cables 60 and 61, as shown at 81 in a second lane 81 from the left in FIG. 8. The upper surface 80 of the bar 74 is designed such that sufficient frictional force is generated between the upper surface 80 and any containers 70 thereon, when the bar 74 is elevated, to effectively resist the forward longitudinal motion of upstream containers 70 in the direction of motion of the cables 60 and 61 of the conveyor 59.

Positioned slightly above the plane created by the cables 60 and 61 and along each side thereof are vertically aligned guide plates 82 to maintain the containers 70 being transported therealong in their relative position above the cables 60 and 61. The guide plates 82 extend from approximately above the tail pulleys 66 and 67 to the head pulleys 63 and 64 and continue on to a point in close proximity to the linkage associated with the transfer conveyor system 5 as more clearly described hereinafter. Coverings or coatings 83 over, on, or around the inner surfaces of the guide plates 82 provide for friction and abrasion reduction relative to containers 70 moving therealong. The guide plates 82 allow free vertical movement of the containers 70 but restrict transverse horizontal movement thereof.

Similarly to the transport conveyor portion 4, the transfer conveyor portion 5 includes a conveyor 84 which may take the form of a single endless cable 85 entrained over a downstream drive or head pulley 86, an upstream tail or driven pulley 87, and idler or make-up pulleys 88 for providing the necessary tensioning. Other conveyor elements, such as two relatively narrow, closely spaced-apart belts or cables, may be used as long as interference with ejection of sticks, as hereinafter described, is avoided. Grooves are provided in the circumferential surfaces of pulleys 86, 87 and 88 as guides for the cable 85.

Positioned immediately below the cable 85 is a support bar or rod 90, as shown in FIG. 3, which extends from the immediate proximity of the tail wheel 87 to the immediate proximity of the head pulley 86. A raceway or groove 91, which is substantially semi-circular in cross-section, is formed in the upper surface of the rod 90. The depth of the groove 91 is less than the diameter of the cable 85 such that containers 3, that are identified as containers 92 while on the cable 85. The containers 92, placed horizontally on the transfer conveyor 84, are frictionally driven by the cable 85 such that the axes of the containers 92 are substantially parallel to the cable 85. The cable 85 tracks in the groove 91 which supports the filled containers 92 positioned thereon. The support rod 90 is constructed of stainless steel or other suitable material.

The single tail pulley 87 of the transfer conveyor 84 is superimposed between the two head pulleys 63 and 64 of the transport conveyor 59. The axes of the two head pulleys 63 and 64 are co-linear with the axis of the single tail pulley 87 therebetween. The diameter of the two head pulleys 63 and 64 is equal to the diameter of the tail pulley 87 such that the two transport conveyor cables 60 and 61, where they are entrained over the head pulleys 63 and 64, straddle the transfer conveyor cable 85 where it is entrained over the tail pulley 87. Although the head pulleys 63 and 64 and the tail pulley 87 share common axes, the tail pulley 87 rotates independently from the rotation of the head pulleys 63 and 64.

The upper tangential points where the transport cables 60 and 61 engage and from there wrap around the head pulleys 63 and 64 and where the transfer cable 85 engages the tail pulley 87 are substantially in line with each other such that containers 70 being transported along the cables 60 and 61 are directly transferred from the transport conveyor 59 onto the transfer conveyor 84 to become the containers 92. Guide rods 93 run along each side of and somewhat above the cable 85 of the transfer conveyor 84 to maintain containers 92 thereon. As with the guide plates 82 of the transport conveyor 59, the spacing between the guide rods 93 superimposed over the cable 85 is slightly greater than the largest diameter of the containers 92 to be handled by the input apparatus 1 of the present invention to allow vertical movement of the containers 92, but to prevent substantial lateral horizontal movement during a stick forming stage or configuration. The guide rods 93 and the cable 85 form an assembly zone or pocket 96 with spacing between the rods 93 being slightly greater than the largest width of the stick of containers 13 assembled therein for subsequent loading onto on a single flight 12 of the endless flight chain 11 of the cooker 2.

The linear velocity of the cable 85 of the transfer conveyor 84 is greater than the linear velocity of the cables 60 and 61 of the transport conveyor 59 such that two containers 70 which are in end-to-end contact on the cables 60 and 61 are automatically spacially separated upon being transferred from the transport cable conveyor 59 to the transfer cable conveyor 84 such that a gap forms therebetween. Conventional article detectors 99, such as photoelectric cells or the like, provide a means for physically counting predetermined number of the containers 92 as they are transported onto the transfer conveyor 84 by detecting the gaps between the containers 92. For each lane of the transfer conveyor 84 (that is, for each lane handling containers 70 in end-to-end relationship), separate detectors 99 are provided.

A mechanical stop 101 at the forward end 102 of the pocket 96 of the transfer conveyor 84 locates the foremost end 103 of the container stick 104 being assembled in the pocket 96 and restrains the foremost container 105 of the stick 104 such that upstream food containers 92 being transported along the cable 85 continue their forward motion until direct contact is made with the immediately preceding one of the containers 92. In this manner, an entire stick 104 of containers 92 can be accumulated or assembled within the zone or pocket 96 of the transfer conveyor 84.

Moving directly below the cable support rod 90 of the transfer conveyor 84 and moving in a direction transverse to the direction of motion of the cable 85 is the loading flight conveyor 106. The conveyor 106 includes a series of voids or flights 107 between spacers or bars 108 thereof. The width of the void 107 between adjacent bars 108 of the loading conveyor 106 is slightly greater than the largest diameter of the containers 92 which are assembled in the container stick 104 in the pocket 96 of the transfer conveyor 84.

The two guide rods 93 positioned along each side of the transfer pocket 96 also function to transfer the container 92 laterally or sideways during a loading stage or configuration, with one serving as a leading rod 109 and the other serving as a pushing or following transfer rod 110. As aforesaid, the transfer rods 109 and 110 in their normal or neutral configuration serve as guides to help stabilize the containers 92 above the cable 85 during and after their transition into the pocket 96. The guide rods 109 and 110 in their stick forming configuration are spaced such that the spacings between the rods 109 and 90 and between the rods 110 and 90 are smaller than the smallest diameter of the containers 92 assembled as a stick 104 in the pocket 96.

A linkage control arm 112 is pivoted about pin 113 that is fixed in position relative to frame 58. One end 114 of the control arm 112 is attached to and secures the pushing rod 110 and the other end 115 is pivotally secured to the plunger of a pneumatic cylinder 116. A linkage 117 pivotally secured to the control arm 112 is also pivotally secured at pin 118 to another link 119 which is pivoted at pin 120 and secured to the leading transfer rod 109 at pin 121. Similar linkage is provided at the upstream end 123 of the transfer rods 109 and 110 as shown schematically in FIG. 6. Alternatively, the extended control arm 112 may be provided at either end or both ends of the pocket 96. The control arm 112 is connected to an activating cylinder 116, such as is shown in FIG. 6. Alternatively, two cylinders may be used on opposite sides of the pocket 96 to motivate arms such as arm 112 on either side thereof in coordination.

The portions of the linkage 122 which are in close proximity to containers 92 entering into the pocket 96 are positioned in close proximity to and are aligned with the downstream ends of the guide plates 82 such that the juncture between the plates 82 and the linkage 122 contribute to a smooth and uninterrupted transition of the containers 92 into the pocket 96.

Upon activation of the cylinder 116 to a stick loading configuration, rods 109 and 110 are jointly and simultaneously moved in a direction transverse to the motion of the containers 92 into the pocket 96, as is shown in phantom in FIG. 3. The pneumatically activated cylinder 116 is coordinated and synchronized with the flights 107 of the loading conveyor 106. Upon a predetermined signal, either manually or automatically from a position sensor, the pneumatically-activated cylinder 116 and the linkage 112, 117, 119, and 122 interconnecting the transfer rods 109 and 110 causes the rods 109 and 110 to move sideways such that the leading transfer rod 109 moves away from the assembled stick 104, thereby creating a spacing between the cable support rod 90 and the leading transfer rod 109 which is greater than the diameter of the containers 92 contained within the pocket 96, while the pushing transfer rod 110 sweeps the assembled container stick 104 through the opening just created between the support rod 90 and the leading transfer rod 109 causing the entire assembled stick 104 to gravitationally drop into an empty loading conveyor flight 107 appropriately located in close proximity therebelow. The sticks 104 are supported in the loading conveyor flights 107 by a shelf 125 positioned immediately below an upper run 127 of the loading conveyor 106, beginning at a location upstream from where sticks 104 are transferred onto the loading conveyor 106 and continuing substantially parallel to the flights 107 to a point where the stick 104 no longer gravitationally bears thereagainst.

For each pocket 96 in the transfer conveyor 106, the leading transfer rod 109 of one pocket 96 simultaneously acts as the pushing transfer rod 110 of the next leftward and adjoining pocket 132, as shown in FIG. 3.

The loading conveyor 106 then transports the transferred sticks 134, such as that shown in phantom in FIG. 3, substantially horizontally in a direction away from the general direction of the cooker 2. Upon reaching an end sprocket 136 of the loading conveyor 106, the transferred container sticks 134 cascade downwardly being constrained to the flights 107 by a duct or sleeve 138 which is substantially uniformly spaced from the sprocket 136 and from a bottom or return run 140 of the loading conveyor 106 such that the container sticks 134 are constrained to the flights 107. The sleeve 138 ends in a lip 142 in close proximity to the open flight 12 of the cooker chain 11.

Preferably, the linear velocity of the loading conveyor 106 is synchronized to the linear velocity of the chain 11 of the hydrostatic cooker 2 such that a one-to-one relationship is obtained between the voids or pocket flights thereof. In particular, the flights 107 of the loading conveyor 106 are coordinated and synchronized with the flights 12 of the hydrostatic cooker chain 11 in an open configuration thereof such that container sticks 134 contained within the flights 107 of the loading conveyor 106 roll out of the flights 107 of the loading conveyor 106 as directed by the lip 142 to be directly gravitationally deposited in a mated open pocket flight 12 of the hydrostatic cooker chain 11.

In actual practice, the various conveyor systems 4, 5 and 6 of the infeed apparatus 1 of the present invention are placed in operation and filled containers 3 are placed horizontally on the double cables 60 and 61 of the infeed transport conveyor 59 by manual loading or by direct delivery from a conveyor associated with a prior process (not shown) wherein the containers 3 are filled. As the containers 3 are transported along the transport conveyor 59 and are transferred to the transfer conveyor 84, gaps automatically appear between the containers 3, which gaps are counted to control the number of containers 3 in a stick 13.

When it is determined that the proper predetermined number of containers 13 has been transferred to the transfer conveyor 84 to assemble an entire stick 13 of containers 3, control means such as an automatic controller or computer (not shown) activates the pneumatic cylinder 76, which is pivotally connected to the braking bar 74, to a braking configuration thereof causing the bar 74 to be elevated such that the containers 70 thereabove are lifted up and off the cables 60 and 61 of the transport conveyor 59. Sufficient frictional forces exist between the elevated containers 70 and the activated braking bar 74 such that the forward motion of oncoming upstream containers 3 on the transport conveyor 59 are resisted, thereby preventing the entry of additional containers 3 onto the transfer conveyor 84.

After a sufficient number of containers 70 have been transferred to the transfer conveyor 84 to assemble an entire stick 104 and the braking bar 74 has been activated, the cable 85 of the transfer conveyor 84 operates continuously to assure that the counting gaps between the containers 92 are closed, thereby obtaining the most efficient packing of containers 92 in each stick 104.

After assembling a container stick 104 on the transfer conveyor 84, the stick 104 is then transferred to the underlying loading conveyor 106. At an appropriately coordinated time when an empty flight 107 of the loading conveyor 106 is synchronized with the transfer path of the container stick 104 as it is ejected from the transfer conveyor 84 onto the loading conveyor 106, the pneumatic cylinder 116 activates the linkage, including control arm 112, connected to the guide rods 93 on each side of the stick 104 such that one of the guide rods 109 moves out of the way while the other guide rod 110 sweeps the stick 104 off the transfer cable 85 onto the loading conveyor 106. The continuously operating loading conveyor 106 conveys the transferred stick 104 to and loads the stick 104 onto an open flight 12 of the cooker chain 11 for routing through the cooker 2 as stick 13.

Immediately after the container stick 104 is transferred from the transfer conveyor 84 onto the loading conveyor 106, the braking bar 74 associated with the transport conveyor 59 reverts to a non-braking, unelevated configuration such that a new cycle of stick generation in the transfer conveyor 84 is initiated.

Figure 9:
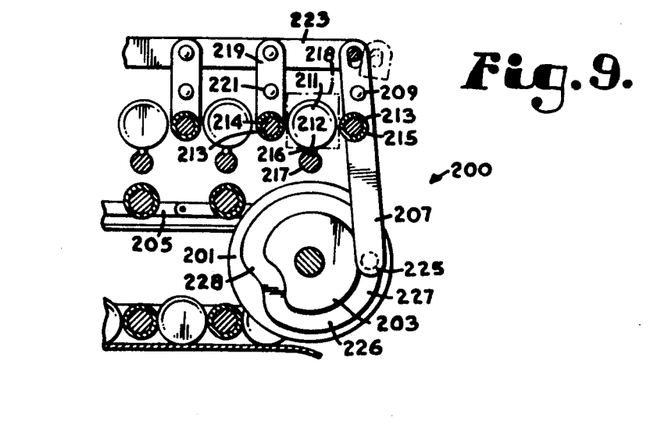
FIG. 9 is an enlarged and fragmentary cross-sectional view of a modified infeed apparatus according to the present invention, similar to the view in FIG. 3 of the previous embodiment, showing a transfer conveyor system and a loading flight conveyor system with a cam-operated transfer linkage associated therewith.

A modified hydrostatic cooker infeed apparatus in accordance with the present invention is shown in FIG. 9 and is generally designated by the reference numeral 200. Many of the characteristics of the modified infeed apparatus 200 are substantially similar to those already described for the apparatus 1 and will not be reiterated here in detail.

Instead of the pneumatically-activated linkage for ejecting container sticks from the transfer conveyor onto an underlying loading flight conveyor shown for apparatus 1, the modified infeed apparatus utilizes a cam 201 attached to a sprocket 203 of a loading conveyor 205. A cam control arm 207 has a pivot axle 209 which is rigidly located relative to a container stick 211 contained on a transfer conveyor 212 that is substantially similar to the conveyor 84 of the previous embodiment. Guide rods 213, including a leading transfer rod 214 and a following transfer rod 215, form side boundaries, along with cable 216 and associated support rod 217 for a bottom boundary, so as to create an assembly zone or pocket 218 for the container stick 211 when in a stick forming configuration thereof.

Similarly to the control arm 207, a follower arm 219 is pivoted on axle 221 and is connected to the control arm 207 through a link 223. A cam follower sensing end 225 of the cam control arm 207 has a depression, protrusion or other means which is adapted to cooperate with a groove, slot, track or other mechanism 226 for appropriately communicating the desired transfer information to the rods 213. The actual configuration of the cam 201 is determined by the number of container sticks 211 which are to be simultaneously transferred to the loading conveyor 205. The circular portion 227 of the track 226 of the cam 201 maintains the guide rods 213 in a non-transfer configuration while the cable 216 assembles the container stick 211 in the pocket 218. A similar set of linkage exists at each end of the pocket 218, interconnected through the rods 213.

As the sensing end 225 of the control arm 207 follows the cam track 226 into the non-circular portion 228 thereof, the sensing end 225 of the control arm 207 moves toward the pocket 218, causing the leading transfer rod 214 to move away from the container stick 211 to a transfer configuration and thereby providing sufficient spacing for container stick 211 to freely pass between transfer rod 214 and support rod 217 while, at the same time, transfer rod 215 simultaneously moves toward container stick 211 sweeping it through the passageway created between guide rod 214 and support rod 217.

Further tracing of the track 226 by the sensing end 225 of the control arm 207 returns the transfer rods 214 and 215 to the non-transfer configurations thereof such that the next cycle of assembling the container stick 211 for subsequent transfer to loading conveyor 205 can be initiated.

Under some circumstances, a linkage associated with a single revolution or indexing clutch (not shown) may be desired to coordinate the ejection of the sticks from the transfer conveyor to the loading conveyor.

It is to be understood that the apparatus and processes described herein are adaptable to all types of containers, including, without limitation, those constructed of metal, glass, plastic and fiber and the like.

It is also to be understood that while certain forms of the present invention have been illustrated and described herein, it is not to be limited to the specific forms or arrangement of parts described and shown.

What is claimed and desired to be secured by Letters Patent is as follows:

1. An infeed apparatus for supplying containers to a cooker including an endless chain having flights; said cooker having a loading station; comprising:
    (a) a transfer conveyor for assembling said containers axially in end-to-end relationship to one another into sticks of a predetermined length; said transfer conveyor having a single cable for frictionally assembling the containers into a stick; said transfer conveyor including an assembly pocket having an elongate support rod substantially centered therebelow for supporting the containers within said pocket; said transfer conveyor having an elongate pair of guide rods positioned above said support rod for maintaining the containers thereon, when in a supporting configuration thereof; said guide rods being laterally spaced to allow the containers to pass therebetween;
    (b) a loading conveyor having at least one open flight; said loading conveyor cooperating with said transfer conveyor to receive each stick therefrom as a unit and adapted to transfer each of the sticks onto the endless chain of the cooker; said loading conveyor including an upper run having an underlying shelf for supporting the containers therein; said loading conveyor including a lower run having an underlying sleeve for supporting the containers therein; said upper run of said loading conveyor sleeve adapted to receive the containers from said transfer conveyor; said lower run of side loading conveyor adapted to receive the containers from said upper run of said loading conveyor; said shelf of said upper run of said loading conveyor and said sleeve of said lower run of said loading conveyor cooperatively adapted to convey the containers from the upper run of said loading conveyor to the lower run of said loading conveyor; said sleeve of said lower run of said loading conveyor further adapted to direct the containers into an empty one of the flights of the cooker chain at the cooker loading station; and
    (c) linkage means to operably transfer each of the sticks from said transfer conveyor to said loading conveyor.

2. The infeed apparatus according to claim 1, including:
    (a) a transport conveyor having two coordinated cables for frictionally transporting containers axially to said transfer conveyor;
    (b) a pair of side plates positioned above said cables for maintaining the containers thereon; said plates being laterally spaced to allow the containers to pass therebetween; and
    (c) elevatable braking bar means for frictionally controlling the flow of the containers along said cables.

3. The infeed apparatus according to claim 2 wherein:
    (a) said linkage means is adapted to coordinate the ejection of a stick from said transfer conveyor into said open flight of said loading conveyor; and
    (b) said linkage means including structure to provide transverse movement of said guide rods in unison to a non-supporting configuration above said loading conveyor such that each stick between said guide rods is gravitationally ejectable from said transfer conveyor onto said loading conveyor.

4. The infeed apparatus according to claim 3 wherein:
(a) said linkage means is pneumatically activated.

5. The infeed apparatus according to claim 3 wherein:
(a) said linkage means is mechanically activated by a cam means which is secured to said loading conveyor.

6. A cooker infeed apparatus for supplying filled, closed food containers to a cooker including a cooker chain having a loading station; said apparatus comprising:
(a) a double cable conveyor adapted to cooperate with a source of the containers so as to receive a continuous supply of the containers onto the double cable conveyor; said double cable conveyor transporting said containers on first and second cables parallel to the axes of the containers; said first and second cables being driven by motor means;
(b) a pair of standards positioned beneath said first and second cables; each said standard having a groove; said first and second cables, with containers thereon, tracking in said grooves and being supported by said standards;
(c) a pair of guide plates positioned along each side of and slightly above said first and second cables to maintain said containers thereon;
(d) a single cable conveyor having a transfer zone; said single cable conveyor cooperatively receiving said containers from said double cable conveyor and transporting said containers to said transfer zone; said single cable conveyor including a third cable and a support rod with a groove; said third cable, with containers thereon, tracking in the groove and being supported by said support rod; said single cable conveyor being operably driven by motor means at a faster linear velocity than said double cable conveyor such that said containers thereon are physically separated from each other immediately after transfer of said containers from said double cable conveyor to said single cable conveyor;
(e) counting means for determining the number of said containers entering said transfer zone on said single cable conveyor; said counting means operably actuating braking means to prevent additional containers from entering said zone once a predetermined number of containers are in said zone so as to form a stick of predetermined length; said braking means frictionally opposing the movement of the containers along said first and second cables;
(f) a pair of elongate rods positioned along each side of and slightly above said third cable to maintain said containers thereon;
(g) a loading conveyor operably moving transverse to said single cable conveyor and having a plurality of flights therein, each of said flights being initially empty and thereby adapted to receive one of the container sticks therein;
(h) transfer means comprising said elongate rods for conveying each stick as a unit from said single cable conveyor to said loading conveyor; said transfer means adapted to be activated when ejection of assembled container stick from said zone is in synchronous coordinated alignment with one of the empty flights of said loading conveyor; said transfer means having a first configuration for assembling said stick of containers and a second configuration for ejection thereof;
(i) shelf means underlying an upper run of said loading conveyor to support the container sticks thereon; and
(j) sleeve means underlying a lower run of said loading conveyor to support container sticks therein; said sleeve means adapted to constrain the sticks of containers when conveyed from said upper run to said lower run and to direct the sticks into open flights at the loading station of the cooker chain wherein said loading conveyor is adapted to transport and deliver each of said sticks of containers as a unit to the cooker.

7. The apparatus according to claim 6 including:
(a) multiple separate double cable conveyors in side-by-side relationship; and
(b) multiple separate single cable conveyors in side-by-side relationship wherein each one of said single cable conveyors paired with a different one of said double cable conveyors; each said single cable conveyor cooperatively receives said containers from the respective double cable conveyor such that multiple sticks are formed simultaneously.

8. The apparatus according to claim 7 wherein:
(a) said loading conveyor has flights with open tops to receive multiple sticks therein; and
(b) said loading conveyor flights are secured to chain linkage driven in a circuitous path with said shelf means being a first support plate and said sleeve means being a second support plate to constrain the sticks during transporting of the sticks in said loading conveyor; said second plate having a lip for directing the sticks into open flights of the cooker chain; said first plate initially supporting the sticks until conveyed to said second plate; and said second plate supporting the sticks until conveyed.

9. The apparatus according to claim 8 including:
(a) a mechanical cam synchronously coordinated with the location of empty flights of the said loading conveyor for activating said transfer means.

* * * * *